United States Patent Office 3,553,999
Patented Jan. 12, 1971

3,553,999
CABLE CLAMP
Reiner Rommel, 6 Moldaustrasse, 3572 Allendorf,
near Marburg, Germany
Filed Aug. 15, 1967, Ser. No. 660,639
Claims priority, application Germany, Sept. 29, 1966,
R 44,228
Int. Cl. B21d 43/28, 27/06, 9/08
U.S. Cl. 72—324          5 Claims

ABSTRACT OF THE DISCLOSURE

A clamp for pressing on electric conductor means as cable shoes, cable connectors and the like on to insulated wire, which comprises two jaws working toward each other. Each of the working jaws is provided on the opposite sides with a molding profile formed as a stamp and a die, respectively, corresponding to one of the electric conductor means. The working jaws include stops which lock and limit the molding profile in its closed position on the jaws. The clamp includes a fixed arm and a movable arm and one of the jaws is pivotally connected with the fixed arm. A toggle lever arrangement is provided which includes a toggle lever and the movable arm. A pivot connects the toggle lever with the movable arm and one of the jaws is movable by the toggle lever arrangement. A support is disposed at the free end of the fixed arm for one end and the toggle lever and adjustable to the required closing pressure such that, during the closing of the clamp, passing the toggle lever pressure point, the jaws are locked in the closing position.

---

The present invention relates to cable clamps, in general, and to a clamp for pressing on cable shoes, cable connectors, flat sockets, compression cable shoes or the like having electric conductors, particularly an insulated wire, in particular.

It allows, in the simplest manner, the production of a solderless connection of electric cables to the components to be joined. For this purpose it is important to remove the insulation from the cable end, without separating the individual wires. After stripping, the cable shoe, connector or the like, which is already provided with an insulating tube, is put onto the bare wire end; subsequently the metallic connection between the holder of the cable shoe and the electric conductor must be made by pressing on and thereafter the pressing on of the insulating of the cable shoe and the insulation of the conductor must be accomplished.

Some known implements used to date for this purpose are large and compact and difficult to operate. Furthermore they are only suitable for certain types of cable connectors, and one had to rely only on certain types of structural elements, respectively.

It is an object of the present invention to provide a simple and inexpensive implement, which can be operated with little expenditure of energy and which guarantees the provision of the required pressing on at the places provided for this purpose. Furthermore the clamp should be suitable for all existing wire diameters, sizes and types of cable shoes.

It is another object of the present invention to provide cable clamps wherein a clamp has two cooperating jaws, which are provided on the opposite sides with a moulding profile formed as a stamp and a die which corresponds to the cable shoe or the like which is to be fixed onto the electric conductor and which in its closed position is locked by stops on the jaws or on the arms of the clamp. The jaw hinged to the moveable arm of the clamp is movable by a toggle lever arrangement and the toggle lever part hinged to this jaw is extended to a handle of the clamp projecting over the toggle lever joint, while the other toggle lever part is supported with its free end on a counter support provided on the fixed arm of the clamp and adjusted to the required closing pressure in such a manner that, during the closing of the clamp by passing the toggle lever pressure point, the jaws are locked in the closing position determined by the stops according to the predetermined closing pressure. Hence it is guaranteed, that when compressing the arms of the clamp and thus pressing the toggle lever drive into its extended position, precisely the correct corrugation profile is produced in the inserted cable shoe during the pressing with the smallest expenditure of energy.

It is advantageous to place the stamp, forming the moulding profile, in the fixed jaw, and the associated die in the movable jaw of the clamp.

In order to be able to use the implement for different types and sizes of cables and cable shoes, in accordance with the present invention, several different sized moulding profiles are provided side by side or in succession in the jaws. The arrangement may be such, that the different moulding profiles are directly adjacent to one another. It is advantageous to provide a cutting section in the jaws in addition to the moulding profiles, whereby the wire which is to be worked, can be cut.

It is still another object of the present invention to provide a cable clamp, wherein in case the wire pressing (i.e. the connection of the metal parts with the bare cable) and the insulation pressing (i.e. the connection of the insulation part of the cable shoe with the insulation part of the cable) are accomplished in one single working operation. For this purpose the moulding profile in the jaws formed as a female and a male die, can be a double profile in order to produce simultaneously the wire pressing and the insulation pressing, wherein the female die, as well as the male die are provided with pressing sections for the wire pressing and the insulation pressing, which are arranged successively according to the longitudinal axis of the material, i.e. transverse to the longitudinal axis of the clamp. It is advantageous to provide the pressing sections for the wire pressing in the plane of the jaw. The design of the clamp jaws allows the usual two pressing operations to be accomplished with a single pressing of the clamp.

In order to perform a so-called nose or notch pressing, which is often applied with non-insulated compression cable shoes, the pressing section forming the male mould is provided with a nose or the like which projects into the female mould.

In one of two of the jaws there is provided, apart from the moulding profile, a marker for the cable shoe or the like, which is to be pressed in the associated moulding profile, which at the same time determines the dimension of the electric cable to be used in the cable shoe. Preferably an insertion is secured in the opening determining the dimension which corresponds in size and color to the insulation part of the cable shoe.

In order to press at the correct place, a disconnectable stop is provided on the one jaw or on the arm of the clamp for the cable shoe which is to be pressed. This stop is an arm extending along the jaw over the moulding profile, which is provided with recesses or the like according to the cable shoes. Furthermore this stop is flexible, so as to yield during the deformation of the cable shoe.

The stop may also be an adjustable slide, arranged perpendicularly to the pressing area, which can be adjusted, as required, for cable shoes, flat sockets or in the zero position and which locks in the different positions under the action of a spring.

In order to be able to use the same clamp for stripping and in order to strip only that length of the wire which is required for putting on the cable shoe, the arms of the clamp are provided with a conventional cutter on the opposite sides with recesses according to the given widths of the wire, so as always to strip only the insulation and not the wire. Within the range of this stripping cutter a template or a stop is provided on one arm of the clamp, which determines the length of the conductor to be stripped.

With these and other objects in view which will become apparent in the following detailed description, the present invention will be clearly understood in connection with the accompanying drawings, in which.

Referring now to the drawings, and in particular to FIGS. 1 to 7, the front portion of a fixed clamp arm 1 is provided with a press jaw 2. A clamp hinge pin 3 carries a pivotable counter jaw 4 which in turn is connected to a movable clamp arm 6 by a hinge pin 5. A toggle lever portion 8 is hinged on the inside of the movable arm 6 by a hinge pin 7, which arm 6 is guided in the fixed clamp arm 1 and is supported by an adjustable block provided therein which comprises the screw 9a and the contour unit 9. The portions 6 and 8 form a toggle lever arrangement by means of which the two press jaws 2 and 4 can be closed according to FIG. 2, whereby the closing pressure is determined by the adjustment of the block 9 and by the stretched position of the toggle lever portions 6 and 8.

A tension spring 10 is provided between the jaw 4 and the fixed arm 1 allows the automatic opening of the clamp components, upon pressing a release lever 11 provided on a pin 12 in the movable clamp arm 6 downwards and hence raises the toggle lever portions 6 and 8 from their stretched position.

Figure 1:
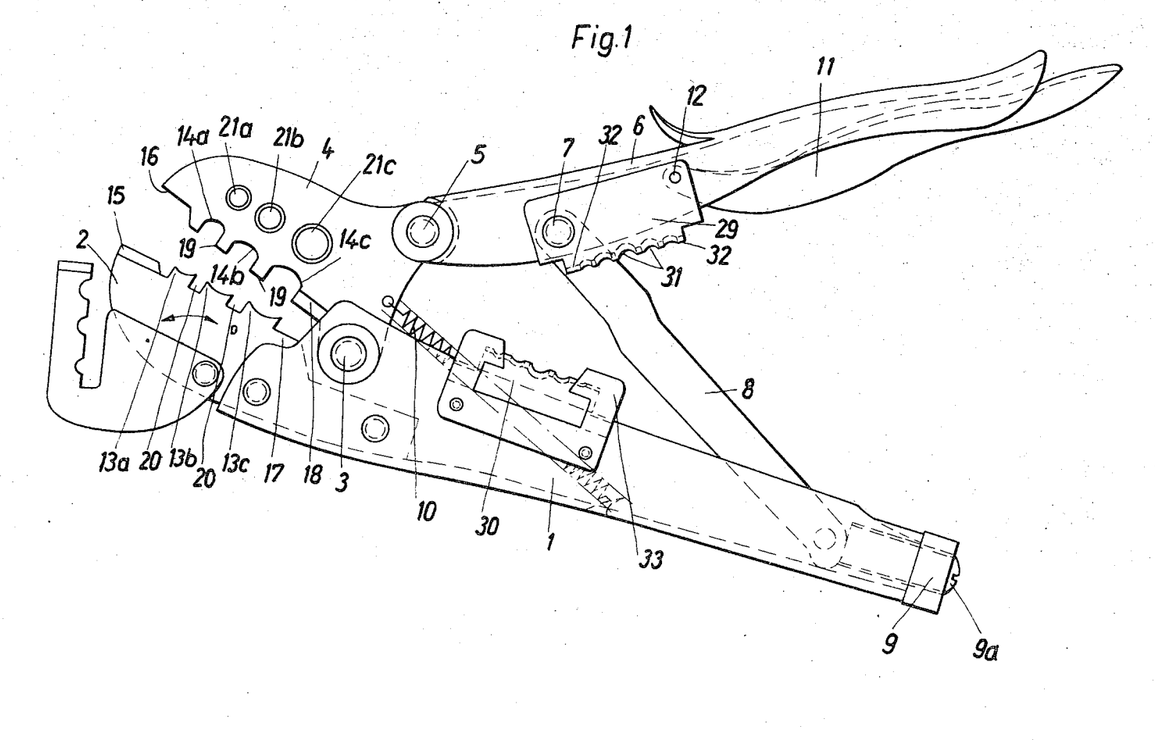
FIG. 1 is a side elevation of the clamp in its opened position.
Figure 2:
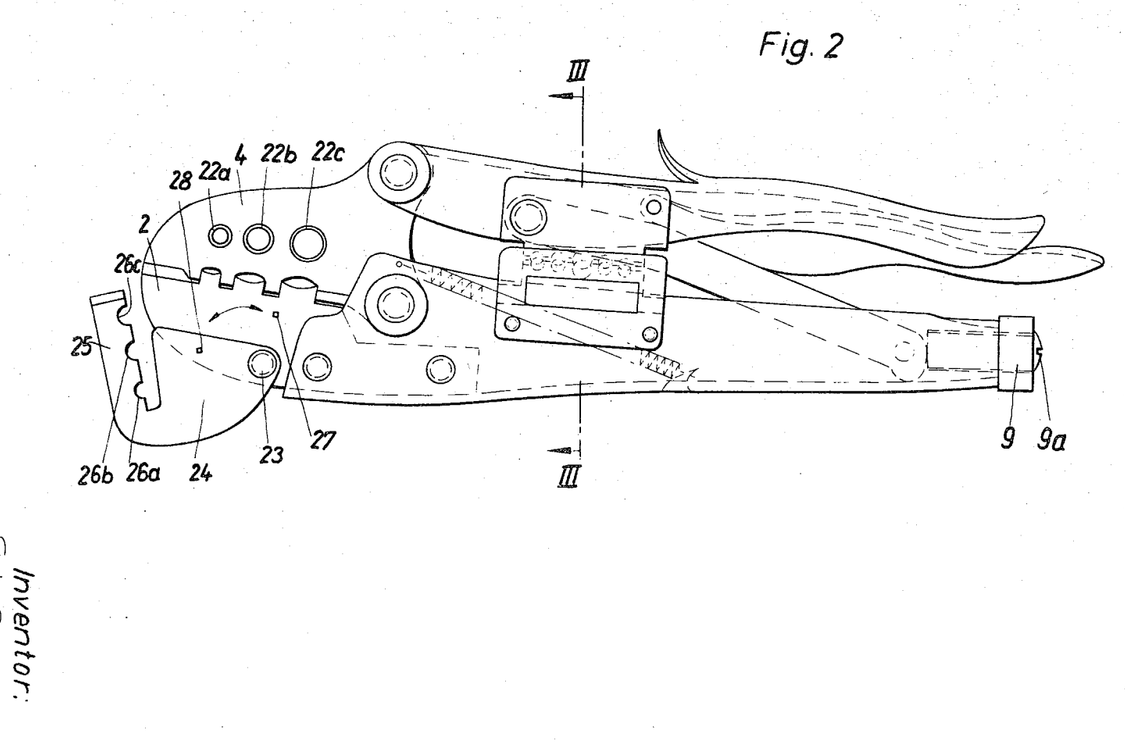
FIG. 2 is a side elevation of the same clamp in its closed position.

Both jaws 2 and 4 are provided with molding profiles on their opposite-facing sides. The fixed jaw 1 is provided with press dies 13a, 13b and 13c arranged closely side by side and opposite thereto are the female molds 14a, 14b and 14c in the movable jaw 4. In the closed position of the jaws 2 and 4 the molding profiles determine the extent to which the cable shoe should be pressed.

As will be understood from the drawings, the molding profiles are of different sizes (a, b, c) so as to be suitable for the conventional sizes of cable shoes, or cable connectors and wire thicknesses. In front or behind the molding profiles the two jaws 2 and 4 may be provided with cutter edges 15 and corresponding portions 16 or 17 and 18 on the opposite sides, between which the cables or wires, which are to be worked, can be cut. Furthermore the cutting implements 15, 16 and 17, 18, respectively, as well as the projections 19 or the recesses 20 between the female molds and the stamps, respectively, serve as stops, which limit the degree of closing of the clamp and hence the extent of pressing of the material. The jaw 4 is also provided with bores 21a, 21b and 21c which are directly next to the molding profiles a, b, c and which are lined with a colored synthetic material 22a, 22b and 22c. The diameter of the cable to be worked in the pressing section opposite is limited by the inside diameter of the bores and linings, respectively. The color of the linings 22a, 22b and 22c determines the type of the cable shoe or connector, which is to be used on the given end of the cable. It is practical to line 22a in red, 22b in blue and 22c in yellow color according to the insulation cover of the individual cable shoe sizes.

The fixed jaw 2 is provided with a pivotable and flexible stop 24 on a hinge pin 23, having an arm portion 25. The portions 24 and 25 can be pivoted from the position of FIGS. 1 and 2 into the position of FIG. 5, where they serve as a stop or insertion gauge for the cable shoes fed into the individual molding profiles so as to be worked. The arm portion 25 is equipped with suitable different sized recesses 26a, 26b and 26c for the cable shoes.

Figure 3:
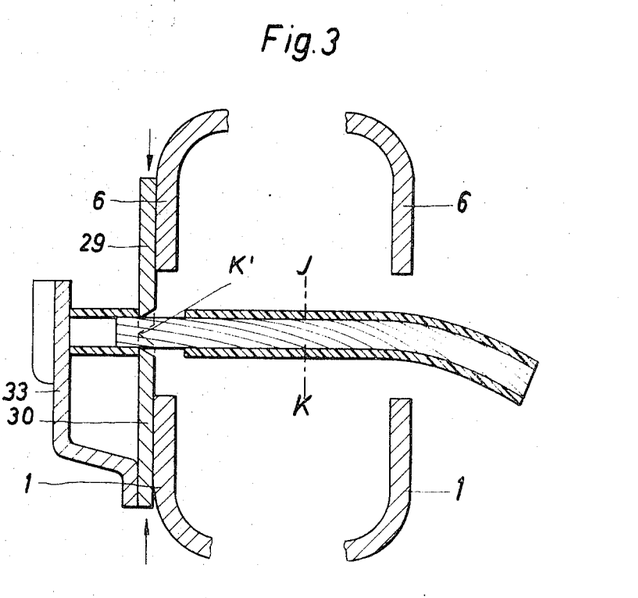
FIG. 3 is a section, along the lines 3—3 of FIG. 2, shown at a very much enlarged scale.
Figure 6:
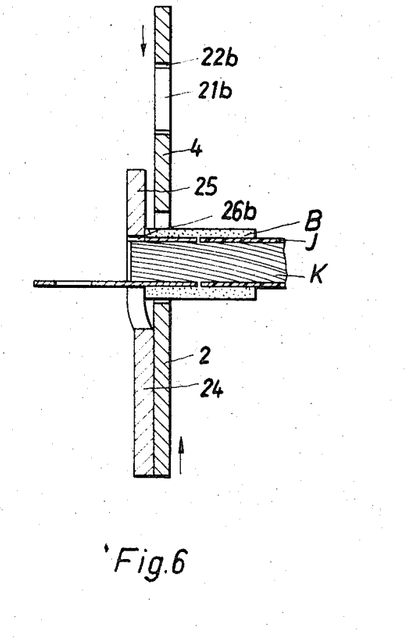
FIG. 6 is a section of the clamp jaws to an enlarged scale immediately before the pressing of an inserted cable shoe.
Figure 7:
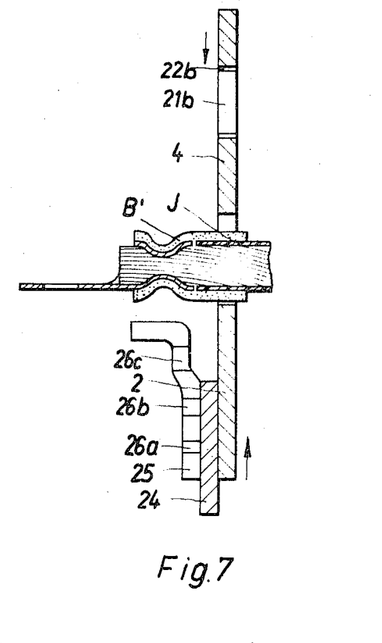
FIG. 7 is the same section, as in FIG. 6, before the securing of the insulation pressing.

In the opened position of the clamp jaws, but with the stops 24 and 25 swung on, the cable shoe B is inserted between the jaws 2, 4 in the manner illustrated in FIG. 6. The cable K was previously inserted into the cable shoe with its stripped end K' (FIG. 3). When the clamp closes, the notching and deformation of the cable shoe is effected by a pressing pressure which is determined by the toggle lever arrangement, which causes the metallic contact to take place in the region of the adjacent metal parts. After the so-called wire-pressing the clamp can again be opened by pressing the release lever 11. Subsequently the cable K can be removed together with the fitted cable shoe from the clamp and, after the stop 24, 25 has been removed, can then again be inserted between the same molding profile parts to such an extent that now, after the clamp is closed again, the so-called insulation pressing can be carried out and only the synthetic material parts of the cable shoe are pressed on the insulation I of the cable K.

In order to lock the stop 24, 25 in its two extreme positions, fasteners or the like are provided on these parts, which are not shown in the illustrated embodiment. A plate spring is mounted on the hinge 23 between the stop 24 and the jaw 2, which allows a lateral yielding of the stop during the pressing operation of the cable shoe. Furthermore there are provided recesses 27 in the sides of the clamp jaw 2 and a projection 28 in the counter face of the stop 24, which, when the stop 24 is pivoted, under the action of the plate spring, engages with one or the other of the two fasteners 27 which are spaced apart for about 90°.

Figure 4:
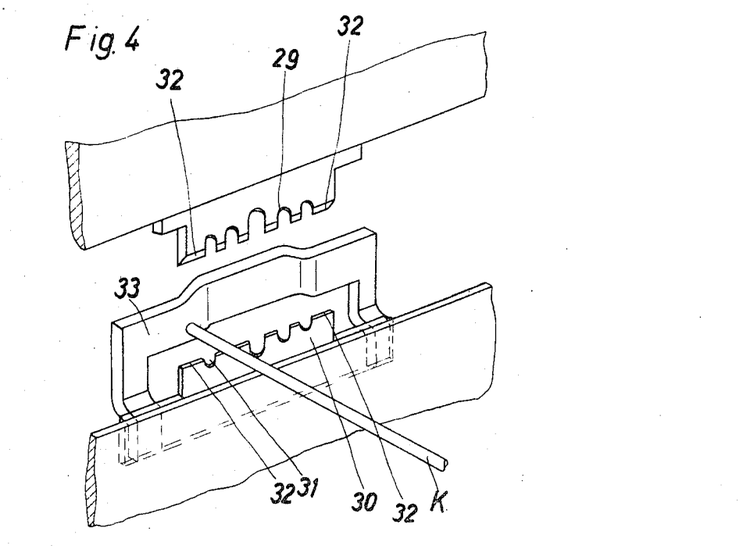
FIG. 4 is a perspective view of the opened stripping means to an enlarged scale.
Figure 5:
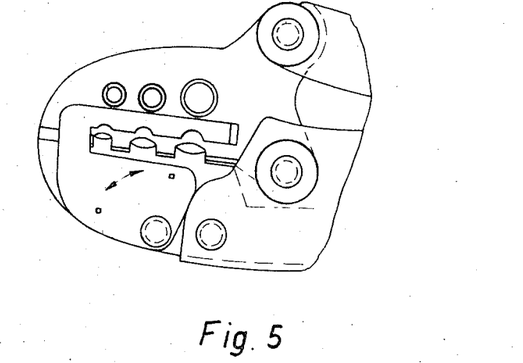
FIG. 5 is a side view of the front portion of the clamp in its closed position with a stopping arm for the cable shoe raised.

In order to allow different cable thicknesses to be stripped with the same clamp, stripping implements 29 and 30 (FIG. 4) in the form of a cutter are provided on the facing sides of the two arms 1 and 6, which have different sized recesses 31 in their cutting edge according to the different wire thicknesses which are to be worked. Furthermore, the cutting edges of the two cutters 29 and 30 are equipped with stops 32, which, when contacting, on closing the clamp arms, prevent the cutters from cutting the metal core as well as the insulation 1 of the cable K. The cable K is inserted from the side into the suitable recess of the cutters 29 and 30 (FIG. 4). Lateral to the implements 29 and 30 and at the level of the cutting section there is a stop bar 33 or a guard, which is secured to the clamp arm 1. This guard is parallel and placed away from the cutting edge at a predetermined distance, so that the wire to be stripped can only be inserted between the implements to a certain depth, i.e. only as far as is required in order to fit the suitable cable shoe size.

Referring now again to the drawings, and in particular to FIGS. 8-23, the clamp according to FIGS. 8-23 corresponds basically to the design of the clamp according to FIGS. 1-7. Merely the stop for inserting the material and the clamp jaws differ from the previously described embodiment.

Here the stop is formed as a stop slide 40. It is guided by a projecting edge 41 in the groove 42 of a plate 43 secured to the clamp arm 1.

Figure 8:
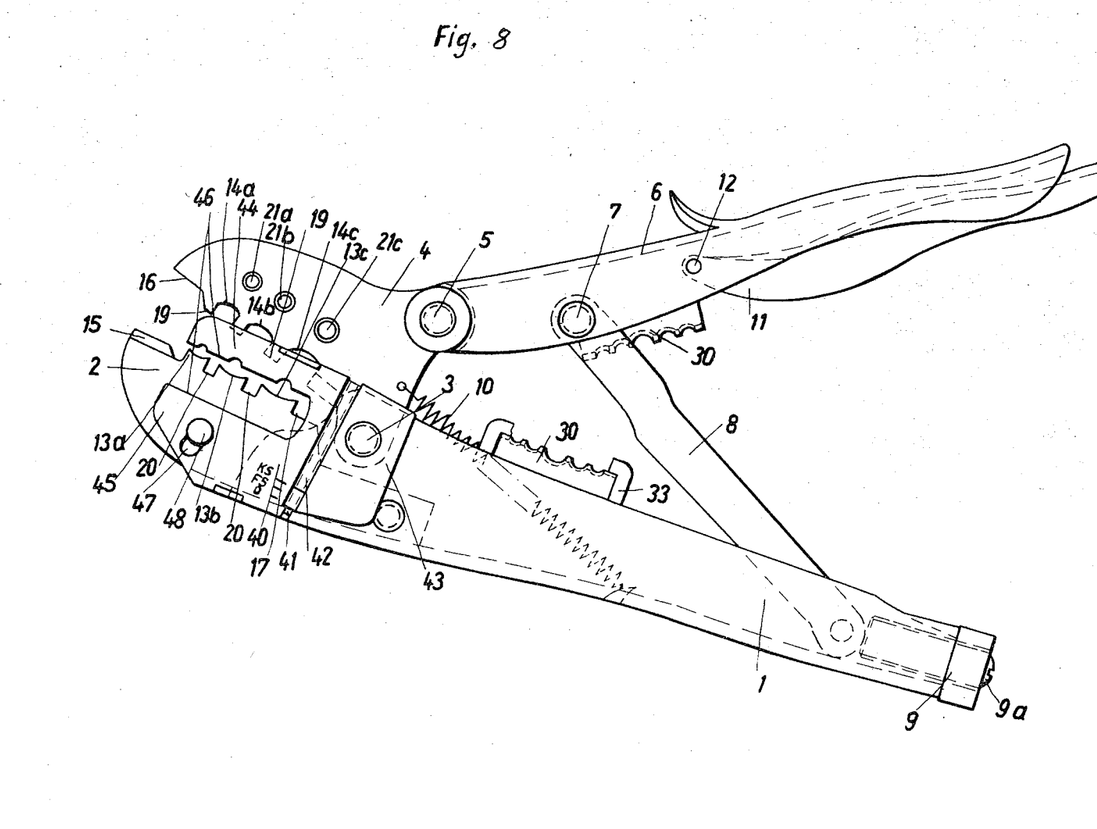
FIG. 8 is a side elevation of another embodiment of the clamp in its open position.
Figures 9, 10, 11:
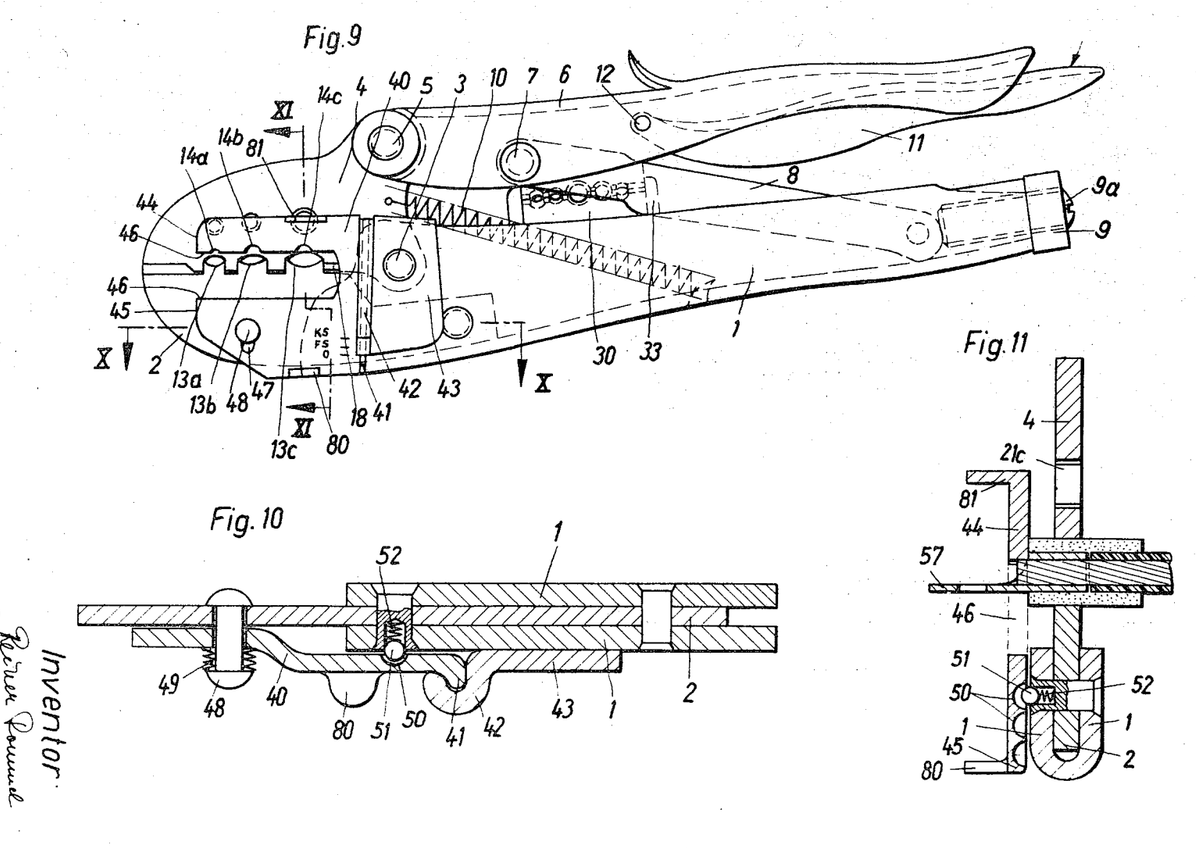
FIG. 9 is a side elevation of the same clamp, as in FIG. 8, in its closed position.
FIG. 10 is a section along the lines 10—10 of FIG. 9.
FIG. 11 is a section along the lines 11—11 of FIG. 9, during the pressing of the cable shoe with a conductor.

As can be seen, particularly from FIGS. 8 and 9, the slide 40 is U-shaped and the two U-arms 44 and 45 project over the molding profiles and leave a clearance 46 between them. In the arm 45 of the slide 40 there is a longitudinal slot 47 which guides the slide on a guide rivet 48. A few plate springs 49 are interconnected between the rivet 48 and the slide 45, which allows the necessary all-round movement of the slide 40.

On the bottom side the slide 40 is provided with recesses 50 for a stop ball 51 located in the arm 1 and being under the action of a pressure spring 52. The top side of the slide 40 is marked "KS" (cable shoe), "FS" (flat socket) and "O" (neutral or zero position). Opposite to this marking there are lined markings on the groove 42. On the edges the slide 40 has turned flanges 80 and 81, which make it possible for the slide 40 to be more easily adjusted.

By means of the hereinbefore described fastening means the slide 40 should be fastened in that position, which is required in order to stop a cable shoe or a flat socket, or to bring the slide into the inoperative position in the event of other kinds of pressings being performed.

The U-shaped design of the stop slide 40 is particularly advantageous in so far as the upper arm 44 of the slide 40 lies in front of the movable clamp jaw 4 and hence serves as an ejector for the material when the clamp is opened. When the release lever 11 is pressed, the clamp jaw 4 returns into its opened position under the action of a tension spring 10. The slide 40, located on the clamp arm 1, retains the material which hangs in the molding profile, with its arm 44.

Figure 12:
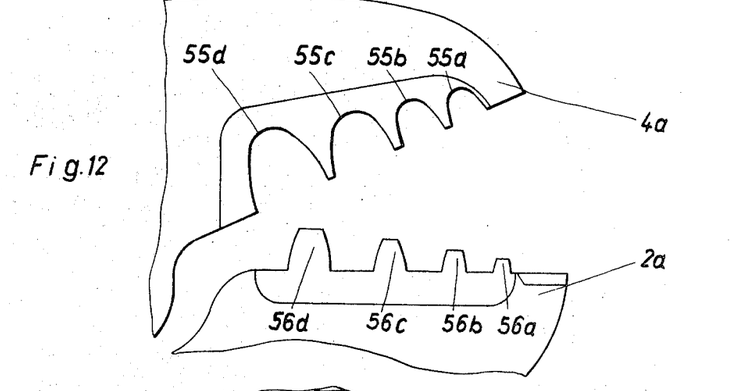
FIGS. 12 and 13 are side elevations of a special design of the clamp jaws to an enlarged scale in opened and closed position, respectively, of the clamp.
Figure 13:
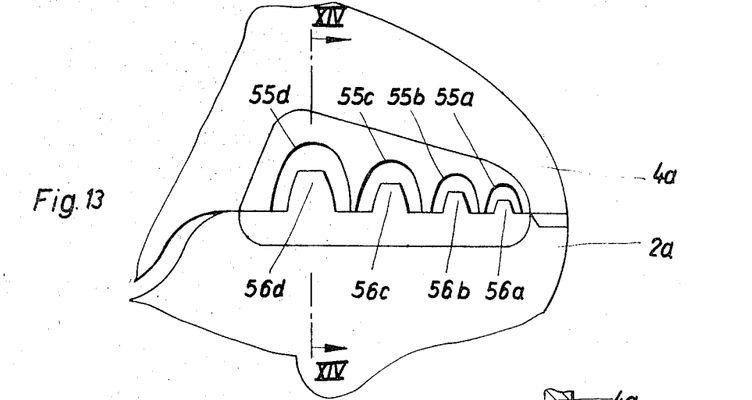
Figure 14:
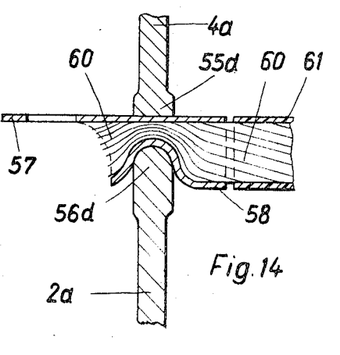
FIG. 14 is a section along the lines 14—14 of FIG. 13 during the pressing of an uninsulated press-on cable shoe.
Figure 15:
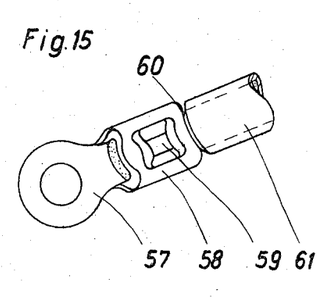
FIG. 15 is a perspective view of a portion of an electric conductor with a compression cable shoe secured thereto by nose pressing.

In the embodiment illustrated in FIGS. 12 and 13 the clamp is provided with the jaws 2a and 4a, respectively. In the opposite sides are provided four molding porfiles behind each other, which consist of female molds 55a, 55b, 55c and 55d and male molds 56a, 56b, 56c and 56d. As illustrated, the female molds are in each case formed as a recess and the male molds as a nose projecting towards the female mold. This type of clamp is used in order to fix so-called press-on cable shoes 57 to a conductor, where the anchoring part 58 for the cable shoe is pushed onto the stripped end of the cable and is pressed with the latter in the clamp. As can be clearly seen from FIGS. 14 and 15, the nose presses a deep groove or notch 59 into the portion 58 of the cable shoe and hence a solderless connection is formed. The insulation 61 of the conductor 60 ends before the cable shoe.

In the two examples of the clamp according to FIGS. 16 to 19 and 20 to 23, respectively, double profiles are provided in the clamp jaws 2b, 2c and 4b, 4c, so as to allow the metallic pressing between the conductor and the cable shoe, socket or the like, i.e. the wire pressing, as well as the pressing of the insulation, i.e., the insulation pressing to be preformed with a single closing movement of the clamp.

Figure 16:
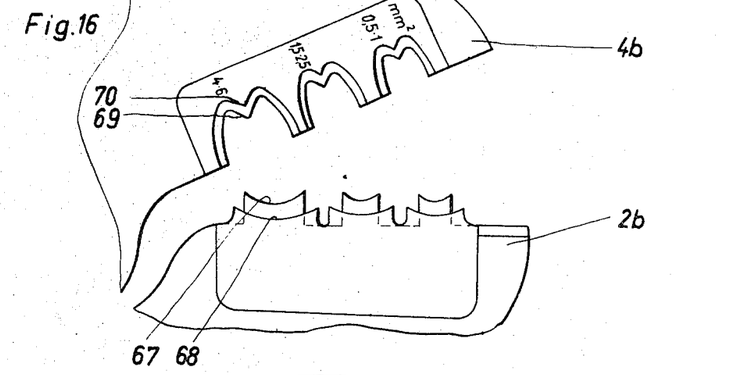
FIGS. 16 and 17 are elevations of a further embodiment of the clamp jaw, to an enlarged scale, of the opened and closed clamp, respectively.
Figure 17:
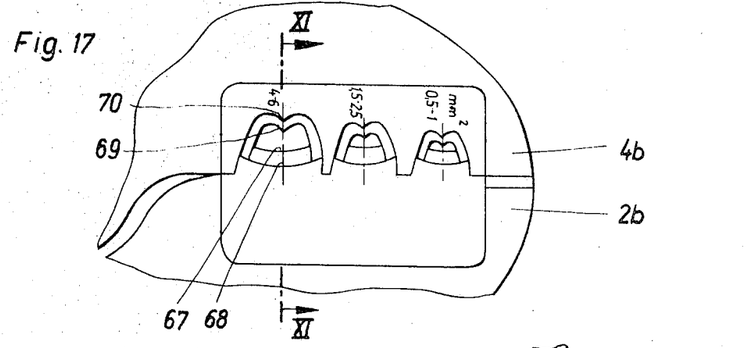

The type of clamp jaws according to FIGS. 16 and 17 is mainly used when pressing so-called flat socket sleeves (FIG. 19) with stripped conductors. Such flat socket sleeves "FS" have a metallic socket portion 62 with a metallic clamping portion 63, which is to be compressed with the stripped conductor 60 while forming a notch 64. In addition thereto, there is also provided a further pressing portion 65, which surrounds the conductor 60 and the insulation 61 and which is also pressed with a pressing notch 66.

Figures 18, 19:
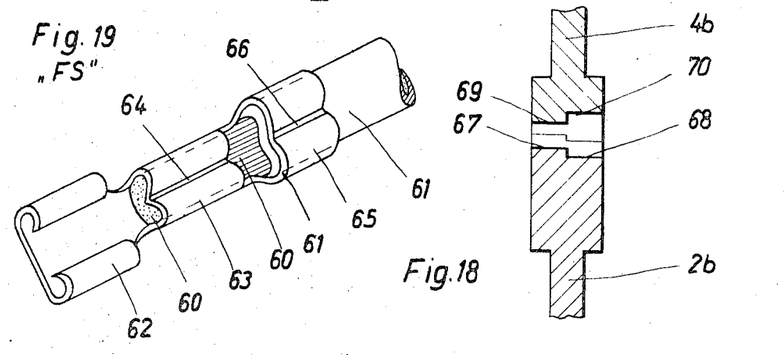
FIG. 18 is a section along the lines 18—18 of FIG. 17.
FIG. 19 is a perspective view of a portion of an electric conductor with a flat socket secured thereto.

In order to join such flat sockets or flat socket sleeves "FS" to conductors, the slide 40 on the clamps has to be pushed to the position "FS." The two pressings 64 and 66 are formed simultaneously when closing the clamp. For this purpose two molding profiles are adjacent to the clamp jaws 2b and 4b. As illustrated in FIG. 18 in each molding profile the jaw 2b is, for example, provided with the support 67 for insertion of the pressing bracket 63 and directly next to it the support 68 for taking up the pressing portion 65 of the flat socket or the flat socket sleeve, respectively. In accordance therewith the clamp jaw 4b has pressing areas 69 and 70, respectively, forming the male mold, which, when the clamp closes, press the compression notch 64 and 66. Naturally several such molding pairs are provided in each clamp jaw according to the different diameters of the wire, as can be seen from the drawings, namely for the wire cross-sections from 0.5 to 1 mm.$^2$, 1.5 to 2.5 mm.$^2$ and 4 to 6 mm.$^2$, so that the usual wire cross-sections can be worked therewith.

Figure 20:
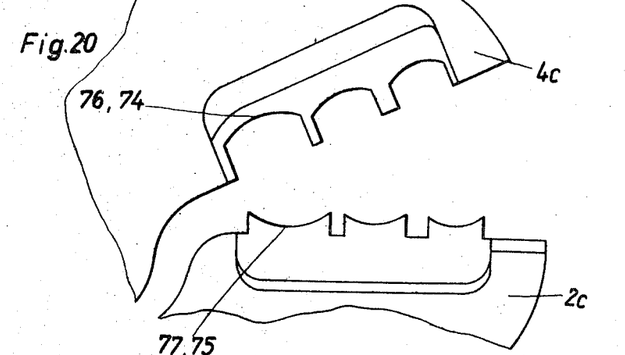
FIGS. 20 and 21 are elevations of a further embodiment of the clamp jaws to enlarged scale, of the opened and closed clamps, respectively.
Figure 21:
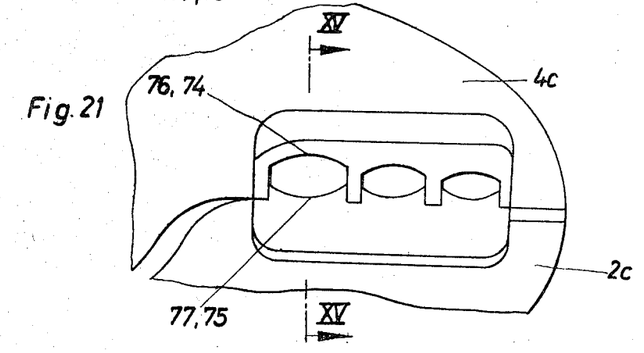
Figure 22:
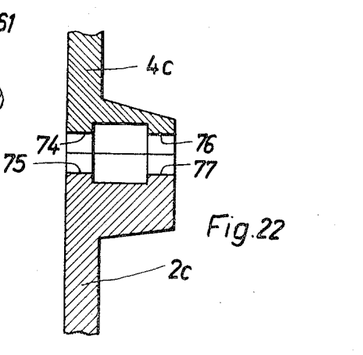
FIG. 22 is a section along the lines 22—22 of FIG. 21.
Figure 23:
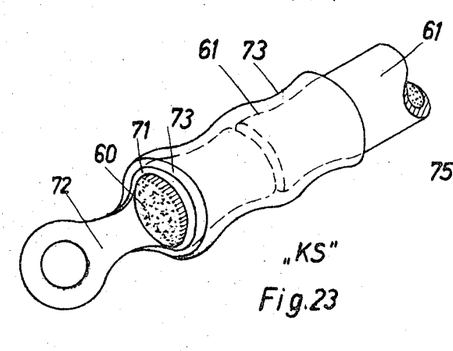
FIG. 23 is a perspective view of a portion of a conductor with an insulated cable shoe secured thereto.

Finally, the embodiment of the clamp illustrated in FIGS. 20 to 22 is mainly designed to perform simultaneously the conductor pressing and the insulation pressing of conductors, which have to be provided with insulated cable shoes, sockets, connectors and the like. For this purpose the metallic press ring 71 of the cable shoe 72 has a sleeve 73 made of insulation material, whereby the metal sleeve 71 is to be pressed with the conductor 60 and the insulation 73 with the insulated portion 61.

Similar to the previous example there are again adjacent pressing areas 74, 75 and 76, 77 provided in the clamp jaws 2c and 4c in each molding profile (FIG. 22).

The solderless pressing of the metal parts 71, 60, i.e., the wire pressing, is effected between the pressing areas 74, 75 while the insulation pressing is accomplished between the pressing areas 76 and 77. Thereby it is advantageous to locate the pressing areas 74, 75 for the wire pressing in the plane of the clamp jaws, while the pressing areas 76, 77 for the insulation pressing lie out-side this plane. Naturally, the arrangement may also be such that the pressing areas are symmetrical to the center plane of the jaws.

It will be understood that the clamp according to the present invention is suitable for solderless joining all kinds of conductors, wires, cables with cable shoes, sockets, connectors, flat socket sleeves, flat sockets or other electric components.

While I have disclosed several embodiments of the present invention, it is to be understood that these embodiments are given by example only and not in a limiting sense, the scope of the present invention being determined by the objects and the claims.

I claim:

1. A clamp for pressing an electric conductor means as cable shoes, cable connectors and the like onto insulated wires, comprising two working jaws movable toward each other to assume open and closed positions, operating means for said jaws including two arms movable toward each other, one of said jaws being rigidly secured to one of said arms and forming with the latter a rigid plier part, the other of said jaws being pivotally connected with said rigid plier part and pivotally connected by means of a first pivot with the other of said arms, each of said working jaws being provided on the opposite sides with a molding profile formed as a stamp and a die, respectively, and adapted to correspond to one of said electric conductor means, a toggle lever pivotally connecting said two arms by means of a second pivot between said other of said arms and said toggle lever, said other of said jaws jointly with said other of said arms and with said toggle lever forming a movable plier part, said other of said arms constituting a movable arm, a first abutment means limiting the closing movement between said rigid plier part and said movable plier part, a straight connecting line between the axes of said first and said second pivots, limiting the toggle lever section of said movable arm, coincides substantially with the longitudinal axis of said movable arm, second abutment means disposed on said rigid plier part and supporting said toggle lever at its end disposed opposite said jaws such, that during the closing movement of said jaws upon passing the toggle lever dead point said first abutment means of said jaws are rigidly pressed toward each other and the closed pliers lock themselves, a disconnectable stop slide disposed on one of said working jaws for said one of said conductor means to be pressed.

said stop slide comprises a carriage displaceably guided perpendicularly to the pressing area and adjustable to a plurality of predetermined working positions according to one of said conductor means, said rigidly secured jaw and said one of said arms in part comprising a carriage guide arranged perpendicularly to said pressing area, said stop slide is guided in said carriage guide, a spring means operatively biasing said stop slide relative to said carriage guide and balancing out play during the guiding of said stop slide in said carriage guide, said stop slide has a longitudinal slot extending perpendicularly to said pressing area, a bolt provided in said carriage guide received in said longitudinal slot, said stop slide being guided by said longitudinal slot on said bolt, said spring means disposed on said bolt, a pressure spring and a ball stop biased by said pressure spring mounted in one of said carriage guide and said stop slide, the other of said carriage guide and stop slide being formed with a plurality of spherical recess portions each disposed in a path perpendicular to said pressing area and for releasable locking pressing of said ball stop selectively therein and constituting said plurality of predetermined working positions, thereby retaining said stop slide in said predetermined plurality of working positions, said stop slide is of substantially U-shape and includes two U-arms, said U-arms extend along said jaws, the gap defined between said U-arms is disposed at the level of said molding profile, so that the upper of said U-arms of said stop slide serves as an ejector of the material to be pressed, and said stop slide being flexibly mounted such, that it does not prevent the deformation of said electric conductor means during the pressing-on process.

2. The clamp, as set forth in claim 1, which includes a disconnectable stop disposed on one of said working jaws for said one of said conductor means to be pressed, said stop comprises a linear member extending along one of said jaws over the corresponding of said molding profiles, which linear member is provided with recesses and abutment faces, respectively, for one of the conductor means at the level of each of said molding profiles, said stop is laterally and pivotally mounted on one of said jaw and said arm, and which includes means for fastening said stop in its extreme pivoted positions.

3. The clamp, as set forth in claim 1, which includes a disconnectable stop disposed on one of said working jaws for said one of said conductor means to be pressed, said stop comprises a carriage displaceably guided perpendicularly to the pressing area and adjustable to a plurality of working positions according to one of said conductor means, two elements comprising a carriage guide arranged perpendicularly to said pressing area and a resilient locking arrangement, both said elements being disposed on said fixed jaw, said stop is guided in said elements with play balanced out by a spring, said slide has a longitudinal slot, a bolt provided in at least one of said jaws and recevied in said slot, said slide being guided by said slot on said bolt, plate springs retaining said slide in a plurality of positions, said stop slide is of substantially U-shape and includes two U-arms, said U-arms extend along said jaws, the gap defined between said U-arms is disposed at the level of said molding profile, so that the upper of said U-arms of said stop slide serves as an ejector of the material to be pressed, said stop slide is flexibly mounted such, that it does not prevent the deformation of said electric conductor means during the pressing-on process, each of said arms has on the side of the other of said arms cutter means leading with their cutting edges into each other and approach each other leaving a slit therebetween, each of said cutter means has recesses corresponding with the diameter of the wires to be cut, and both cutter means in their extended position of said toggle lever arrangement are disposed close to each other such, that said recesses remaining between said cutter means and that a stripping of the insulation removed by said cutter means.

4. The clamp, as set forth in claim 3, which includes a projection means disposed on one of said arms within the range of said cutter means and constituting simultaneously a measure for the length of said electric wire to be stripped.

5. The clamp, as set forth in claim 4, wherein said projection means comprises a free bracket extending over the length of insulation.

References Cited

UNITED STATES PATENTS

| | | | |
|---|---|---|---|
| 2,489,895 | 11/1949 | Kash | 81—370 |
| 2,514,130 | 7/1950 | Jones | 81—370 |
| 2,604,803 | 7/1952 | McCann | 81—370 |
| 3,262,343 | 7/1966 | Weller | 81—370 |
| 2,386,327 | 10/1945 | Martin | 81—9.5 |
| 2,411,838 | 11/1946 | Swengel | 72—410 |
| 2,627,769 | 2/1953 | Anderson et al. | 72—410 |
| 2,668,464 | 2/1954 | Paules | 7—5.2 |
| 2,696,747 | 12/1954 | Bergan | 72—410 |
| 2,774,269 | 12/1956 | Demler et al. | 72—472 |
| 2,829,549 | 4/1958 | Demler | 29—203 |
| 2,965,147 | 12/1960 | Hoffman | 29—203 |
| 3,009,503 | 11/1961 | Holtzapple | 29—203 |
| 3,175,281 | 3/1965 | Elfsten | 72—410 |
| 3,314,135 | 4/1967 | Smith | 72—410 |
| 3,386,153 | 6/1968 | Lau et al. | 29—203 |

FOREIGN PATENTS

| | | | |
|---|---|---|---|
| 647,526 | 10/1962 | Italy | 7—5.1 |
| 1,166,710 | 3/1964 | Germany. | |

CHARLES W. LANHAM, Primary Examiner

E. M. COMBS, Assistant Examiner

U.S. Cl. X.R.

29—203; 72—410